United States Patent [19]
Cravero

[11] Patent Number: 5,787,704
[45] Date of Patent: Aug. 4, 1998

[54] ELECTRONIC PURIFICATION OF EXHAUST GASES

[76] Inventor: Humberto Alexander Cravero, 12 Kay Street, Carlingford, New South Wales 2118, Australia

[21] Appl. No.: 592,420
[22] PCT Filed: Aug. 10, 1994
[86] PCT No.: PCT/AU94/00464
 § 371 Date: Feb. 6, 1996
 § 102(e) Date: Feb. 6, 1996
[87] PCT Pub. No.: WO95/04875
 PCT Pub. Date: Feb. 16, 1995

[30] Foreign Application Priority Data

Aug. 10, 1993 [AU] Australia .................. PM0461
Oct. 5, 1993 [AU] Australia .................. PM1582

[51] Int. Cl.$^6$ ........................................... F01N 3/02
[52] U.S. Cl. ................. 60/274; 55/DIG. 30; 60/275; 96/97; 96/100
[58] Field of Search ............. 60/275, 274; 55/DIG. 30; 96/97, 100

[56] References Cited

U.S. PATENT DOCUMENTS

| | | | |
|---|---|---|---|
| 2,989,144 | 6/1961 | Styrie | 60/275 |
| 3,503,704 | 3/1970 | Marks | 60/275 |
| 4,478,613 | 10/1984 | Brettschneider | 60/275 |
| 4,643,745 | 2/1987 | Sakakigara | 55/137 |
| 4,657,738 | 4/1987 | Kanter | 55/DIG. 30 |
| 5,199,257 | 4/1993 | Colletta | 60/275 |

FOREIGN PATENT DOCUMENTS

| | | | |
|---|---|---|---|
| 0519882 | 12/1992 | European Pat. Off. | |
| 5010480 | 4/1970 | Japan | 96/97 |
| 6238194 | 8/1994 | Japan | 96/97 |
| 1667929 | 8/1991 | U.S.S.R. | 96/97 |

*Primary Examiner*—Douglas Hart
*Attorney, Agent, or Firm*—Ladas & Parry

[57] ABSTRACT

An ionization unit is placed in an engine exhaust system. The ionization unit comprises an inlet to a first chamber and an outlet from a second chamber. Within the first chamber there is located an anode mesh and a grid mesh adapted to place a negative charge upon particulate matter passing through the first chamber. Within the second chamber there is located an anode element positively charged to attract the negatively charged particulate matter. Relatively clean air is exhausted at the outlet.

12 Claims, 3 Drawing Sheets

ELECTRONIC PURIFICATION OF EXHAUST GASES

FIELD OF THE INVENTION

The following invention relates to electronic purification of exhaust gases. Vehicles powered by internal combustion engines release exhaust gases into the atmosphere. These gases contain a number of pollutants such as carbon, lead, other metallic particles and burnt oil. The pollutants are of microscopic dimensions, and once in the atmosphere mix and dissipate through the air creating smog. Pollution particles of such small dimensions are impossible to trap with conventional filters. People subjected to the pollution can be affected with different illnesses such as asthma, hayfever, lead poisoning, eye irritation and other ailments.

OBJECT OF THE INVENTION

It is the object of the present invention to provide a means by which microscopic and larger particulate pollutants contained in exhaust gases of vehicles powered by internal combustion engines may be treated.

DISCLOSURE OF THE INVENTION

There is disclosed herein an exhaust gas purification apparatus comprising:

a housing having an inlet and an outlet;

purification means adapted to alter the properties of exhaust gas passing through the housing from the inlet to the outlet, said purification means comprising a substantially planar array of cathode pins within the housing, with said pins extending substantially normal to the plane of the array and adapted to electrically charge gas borne particles within the housing as gas passes through the array of cathode pins.

Preferably, said cathode pins are formed upon a cathode mesh through which the exhaust gas must pass.

Preferably, said cathode means further comprises a grid mesh through which said exhaust gas must also pass, said grid mesh being located downstream of the cathode mesh.

Preferably, said cathode mesh is adapted to be charged and said grid mesh is adapted to be charged, though positive with respect to said cathode mesh.

Preferably, the apparatus further comprises an anode element located within the housing, the anode element being adapted to be charged positively with respect to the grid mesh.

Preferably, said cathode mesh is adapted to be highly negatively charged and said grid mesh is adapted to be negatively charged, though not as highly negatively charged as the cathode mesh.

Preferably, the anode element is adapted to be highly positively charged.

Preferably, said cathode mesh comprises a plurality of crossing conductive elements having extending from the points of intersection thereof a plurality of pins.

Preferably, said cathode means is provided in a first chamber and said anode element is located in a second chamber located downstream of said first chamber.

Preferably, said housing is formed of electrically nonconductive material.

There is further disclosed herein an exhaust gas purification system comprising the exhaust gas apparatus as disclosed above, and;

an oscillator circuit adapted to be connected to a motor vehicle battery to produce an alternating current;

a transformer electrically connected to the oscillator circuit;

voltage multiplication means connected to the transformer and comprising:

a first terminal adapted to be connected to a grounding brush or the like;

a second terminal adapted to provide high positive voltage to said anode element; and a high negative voltage terminal adapted to be connected to said cathode means.

The exhaust gas purification system might also comprise a medium negative voltage terminal adapted to be connected to a grind located within said housing.

Beneficially, a catalytic effect to the gases occurs as a result of strong electronic bombardment as the gases pass through the first chamber.

The negative ions, once attracted to the anode element discharge consequently altering the structure of the molecules thus separating them into their original component, say oxygen and nitrogen.

There is further disclosure herein a method of purifying exhaust gas, the method comprising:

providing a housing an inlet and an outlet;

providing a planar array of cathode pins within the housing, with said pins extending substantially normal to the plane of the array;

passing exhaust gas through the housing from the inlet to the outlet such that the gas passes through the array of cathode pins thereby electrically charging gas born particles.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
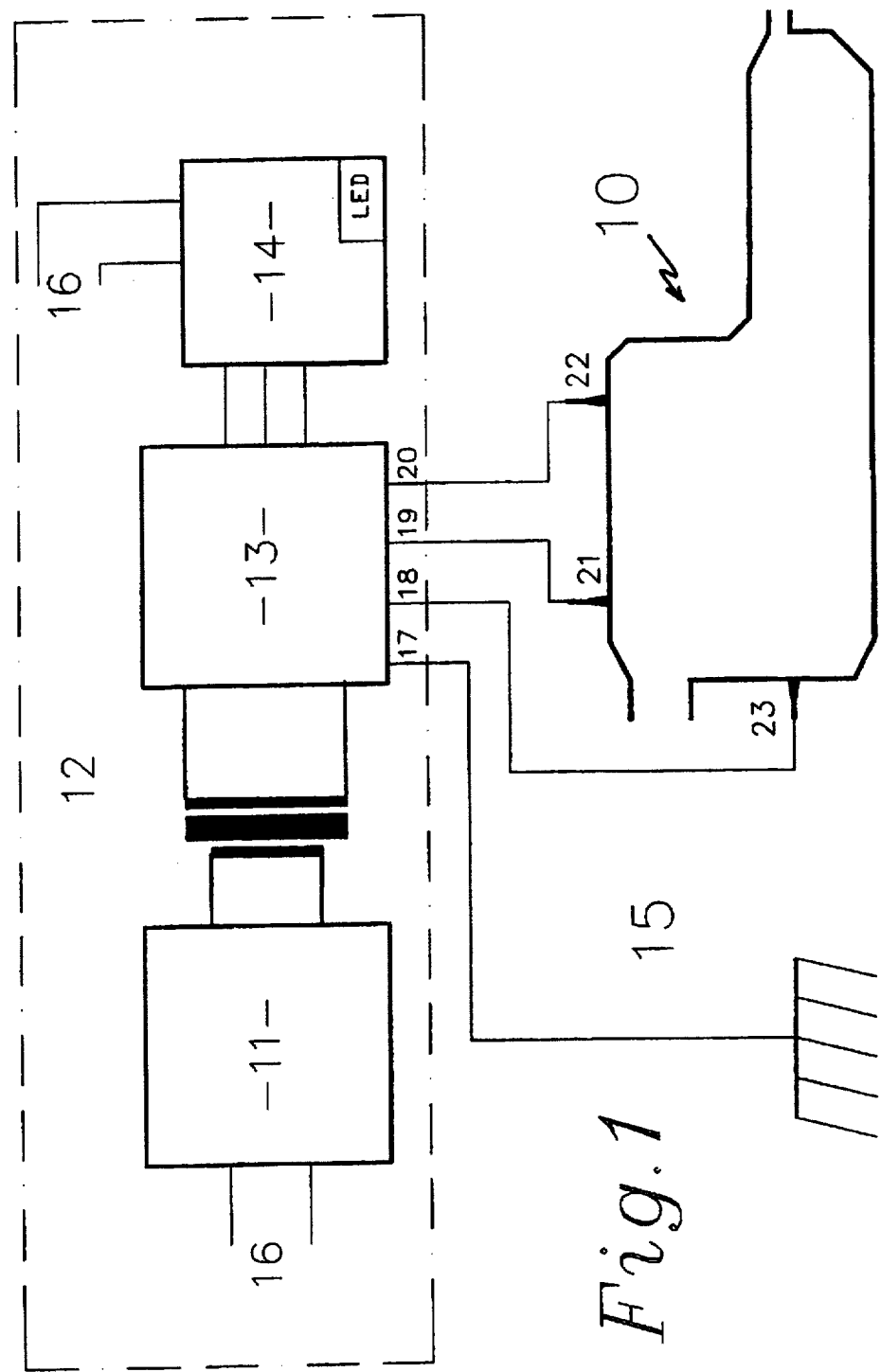
FIG. 1 is a schematic illustration of an electronic unit depicted within a borderline and remote devices outside the borderline.

Depicted in FIG. 1 is an electronic oscillator circuit 11, transformer 12, voltage multipliers 13, monitor circuit 14, ionisation unit 10 and earthing brush 15. The oscillator circuit 11 is connected to a battery 16 as illustrated. The output from oscillator circuit 11 is transformed by transformer 12 to be input to the voltage multiplier 13. The monitor circuit 14, communicating with the voltage multiplier 13 also receives voltage from battery 16.

The outputs 17, 18, 19 and 20 of voltage multiplier 13 are connected to the earthing brush 15, a high positive voltage terminal 23 of ionisation unit 10, a high negative voltage terminal 21 or ionisation unit 10, and a medium negative voltage terminal 22 of ionisation unit 10, respectively.

When the ignition of the vehicle is turned on, the oscillator circuit 11 begins to electronically oscillate, generating an alternating current at an amplitude of 12 volts pp. The inductance of the transformer 12 forms part of the oscillator circuit and determines the frequency of the oscillation, consequently producing an oscillating electro-magnetic field in the nucleus of the transformer 12. The secondary winding of transformer 12 has a high ratio with reference to the primary, resulting in an alternating current of a higher voltage. The voltage from the secondary winding of transformer 12 is then stepped up by the voltage multiplier circuit 13 having negative polarity to obtain a medium level voltage at output 20 and a high level voltage at output 19, both being DC voltages of negative polarity.

The same alternating current from the secondary winding of transformer 12 is also driven to a voltage multiplier of positive polarity to obtain a high level voltage of positive polarity at output 18.

Output 17 is connected to earthing brush 15 which comprises say four thin steel wires attached such that they run from the chassis of the vehicle to the ground so as provide electrical conductivity between the vehicle and the ground. The purpose of brush 15 is to avoid a build-up of static electricity in the body of the vehicle.

Figure 2:
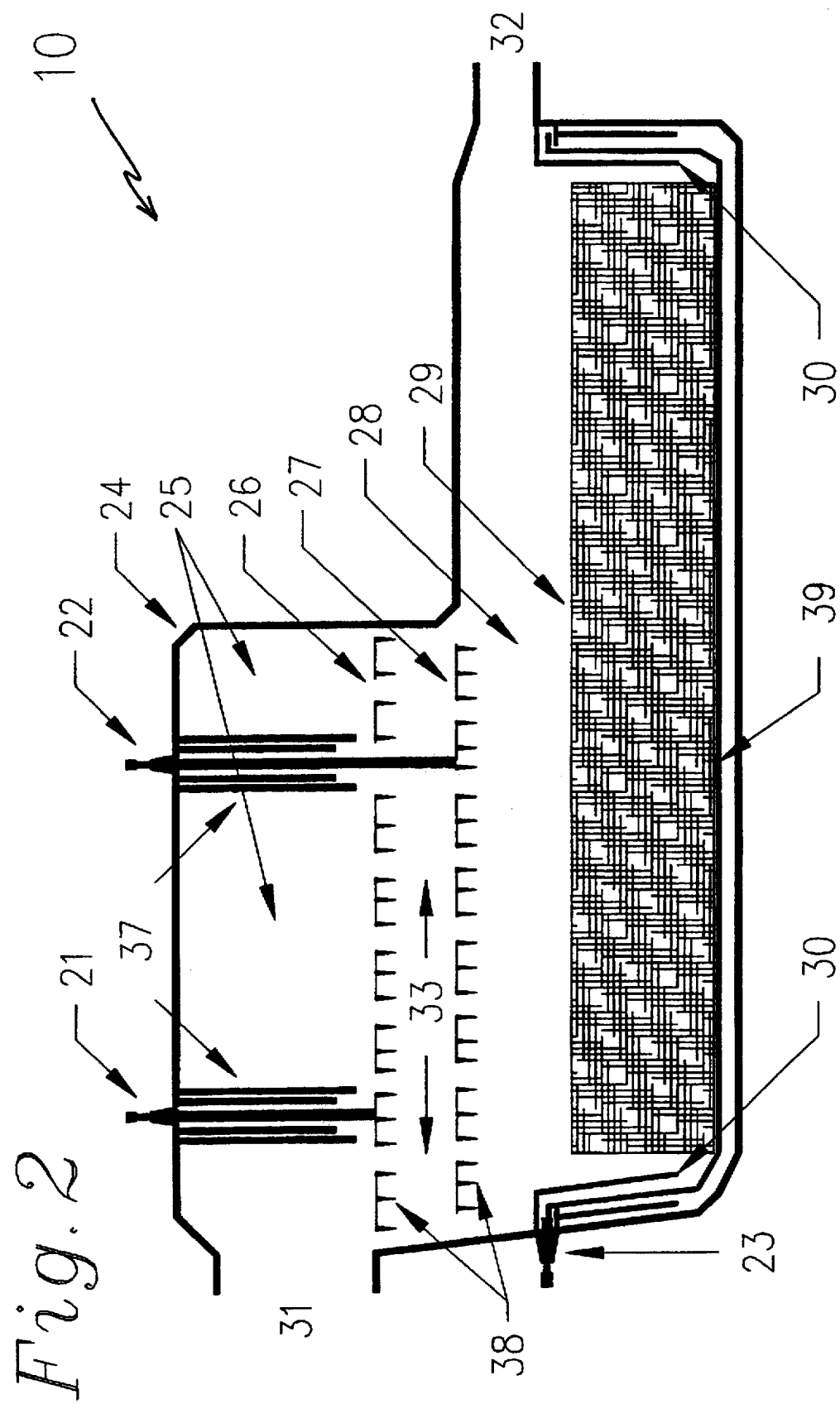
FIG. 2 is a schematic cross-sectional elevational view of an ionisation unit, being one of the remote devices shown in FIG. 1.

With reference to FIG. 2, the high negative voltage from the voltage multiplier output 19 is applied to the cathode mesh 26 via high negative voltage terminal 21 and insulator 37. Ionising electric coronas appear at every pin 38 of the mesh 26.

The medium level negative voltage from output 20 is applied to the grid mesh 27 via medium negative voltage terminal 22 and a similar insulator 37. This voltage although of negative polarity, has a significant difference of potential as compared to cathode mesh 26 and it therefore appears positive with respect thereto, consequently producing an attraction to the loose electrons in the electric coronas of the cathode mesh 26 thus creating a flow of electrons from the cathode 26 to the grid 27. This area where the flow of electrons occurs might be termed an "ionisation area".

The high level positive voltage from output 18 is connected via the high positive voltage terminal 23 to provide energy to the anode element 29.

When exhaust gases from the exhaust of a motor vehicle enter via the inlet 31 into the first chamber 25, the gases then expand throughout the volume of the first chamber. The gases are then forced to pass through the openings of the cathode mesh 26. The area of the cathode mesh 26 is several times that of the area of the circumference of the exhaust pipe of the motor vehicle; thus reducing the speed of the gases as they pass through the cathode mesh 26 by that ratio. Typically, this ratio might be 1:70.

The gases pass through the cathode mesh 26 at a low speed and enter the ionisation area 33 between the cathode mesh 26 and the grid mesh 27. Electrons are added to the particles entrained in the gas stream in this zone, thus converting them into negative ions. The negatively ionised pollution is then forced to pass through the grid mesh 27 and into the second chamber 28. The gases undergo further electron bombardment and ionisation as a result of pins 38 of mesh 27 as the gas enters chamber 28.

At the opposite or lower side of the second chamber 28, there is located the anode element 29, typically in the form of a grid of steel mesh or steel wool or the like. The anode element 29 might be composed of multiple layers of electrically conductive mesh.

As the anode element 29 is polarised with a highly positive electric charge, it strongly attracts the negatively ionised pollution particles, which are then retained by the structure of the anode element. Theoretically, molecules of toxic substances such as $NO_2$ (nitrogen dioxide), being ionised are then discharged against the anode element and consequently the molecules separate into their original elements being nitrogen and oxygen.

The anode element 29 is supported upon an electrically conductive support 39 to which the high positive voltage terminal 23 is electrically connected. The housing 24, being typically fabricated from an electrically non-conductive material, if of a fragile or easily damageable nature, might be coated with a flexible, shock resistant, non-conductive coating such as rubber.

The purified gases continue to travel towards and through the outlet 32 into the external atmosphere. The outlet 32 might be dimensioned as quite a broad slot such that the actual exit velocity of gases is quite low. The actual area of the outlet 32 might be the same as or close to the area of the inlet 31. If provided in the form of an elongate slot the outlet 32 would reduce exit gas velocity and the likelihood of turbulence nearby the anode element 29.

The cathode mesh 26, grid mesh 27 and anode element 29 are typically replaceable components. The anode element 29 might however be designed to be periodically cleaned and reused.

Typically, the width of the housing 24 is in the vicinity of one meter, dependent upon the size of the vehicle and engine capacity.

It is envisaged that the entire unit 10 would be installed at the rear of a vehicle nearby the bumper bar and that the gases from the exhaust pipe of the motor vehicle might be connected with input 31 via a flexible metallic pipe.

Figure 3:
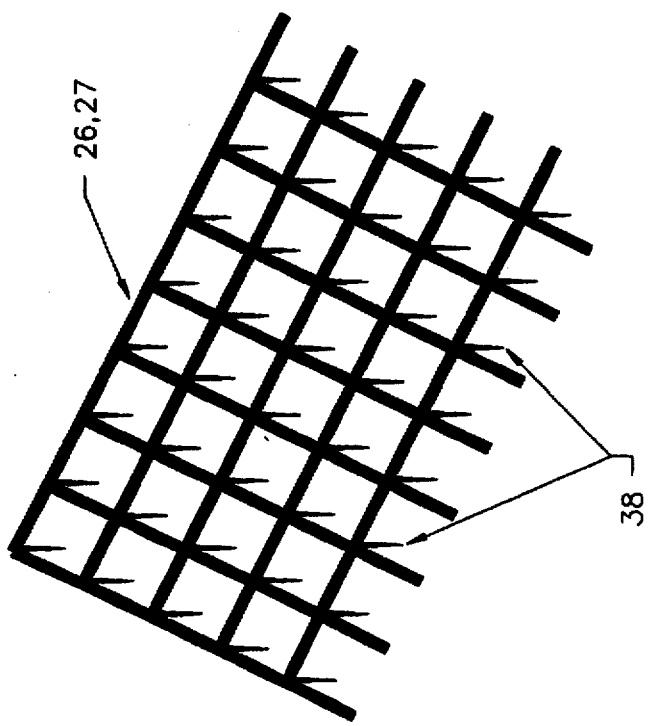
FIG. 3 is a schematic perspective view of a cathode grid mesh forming part of the ionisation unit of FIG. 2.

FIG. 3 depicts either the cathode mesh 26 or grid mesh 27. The mesh 26, 27 comprises a plurality of crossing elements and a multitude of electrically conductive pins 38 extending downwardly therefrom. The pins generally extend from the point of intersection of each of the crossing members, though might extend from points between the intersections.

Figure 4:
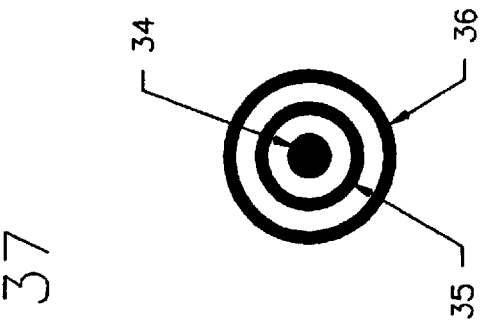
FIG. 4 is a schematic cross-sectional view of an insulator, also forming part of the ionisation unit of FIG. 2.

As shown in FIG. 4, each insulator 37 surrounds an internal conductor 34. The insulators 37 comprise an internal insulating tube 35 and an external insulating tube 36. The internal conductor 34 serves as a means of supporting the respective mesh within the housing 24 and for conducting electrical charge thereto. Further non-conductive means of supporting the respective mesh panels might also be provided internally of the housing 24. The purpose of each insulator 37 is to aid in preventing electrical conduction or conduction of electrical charge from conductors 34, cathode mesh 26, or grid mesh 37 through moisture of settled condensation to the motor vehicle chassis. That is, after initial engine start up, typically where a large quantity of steam is passed through the exhaust system, such steam might condense upon the internal surfaces of the ionisation unit 10. To aid in preventing conduction through such condensed moisture, the internal and external surfaces of the internal and external insulating tubes 35, 36 extend the distance over which surface conduction must occur. Furthermore, it is expected that the provision of the large internal cavity of each insulator will prevent condensation in that area, thus allowing no direct line of condensation between the charged internal components of the ionisation unit 10 and say the metallic exhaust pipe connected to the unit 10 at inlet 31.

It should be appreciated that modifications and alterations obvious to those skilled in the art are not to be considered as beyond the scope of the present invention.

For example, the particular arrangement of components within the housing 24 may be altered without departing from the spirit or scope of the invention.

I claim:

1. An exhaust gas purification apparatus comprising:

a housing having an inlet and an outlet;

purification means adapted to alter the properties of exhaust gas passing through the housing along a flow-path from the inlet to the outlet, said purification means comprising a substantially planar array of cathode pins within the housing, with said pins extending substantially normal to the plane of the array and adapted to electrically charge gas borne particles within the housing as gas passes through the array of cathode pins, wherein said cathode pins are formed upon a cathode mesh through which the exhaust gas must pass; and an anode element located withing the housing downstream of said cathode mesh and substantially out of said flow-path, said anode element being adapted to be positively charged so as to attract and retain negatively ionized pollution particles from said exhaust gas therein.

2. The exhaust gas purification apparatus of claim 1, wherein said purification means further comprises a grid mesh through which said exhaust gas must also pass, said grid mesh being located downstream of the cathode mesh.

3. The exhaust gas purification apparatus of claim 2, wherein said cathode mesh is adapted to be charged and said grid mesh is adapted to be charged, though positive with respect to said cathode mesh.

4. The exhaust gas purification apparatus of claim 3, wherein the anode element is adapted to be charged positively with respect to the grid mesh.

5. The exhaust gas purification apparatus of claim 2, wherein said cathode mesh is adapted to be highly negatively charged and said grid mesh is adapted to be negatively charged, though not as highly negatively charged as the cathode mesh.

6. The exhaust gas purification apparatus of claim 1, wherein said cathode mesh comprises a plurality of crossing conductive elements having extending from the points of intersection thereof a plurality of pins.

7. The exhaust gas purification apparatus of claim 1, wherein said cathode mesh is provided in a first chamber and said anode element is located in a second chamber located downstream of said first chamber.

8. The exhaust gas purification system of claim 1, wherein said housing is formed of electrically non-conductive material.

9. An exhaust gas purification system comprising the exhaust gas purification apparatus of claim 1 and:

an oscillator circuit adapted to be connected to a motor vehicle battery to produce an alternating current;

a transformer electrically connected to the oscillator circuit; voltage multiplication means connected to the transformer and comprising:

a first terminal adapted to be connected to a grounding brush or the like;

a second terminal adapted to provide high positive voltage to said anode element; and a high negative voltage terminal adapted to be connected to said cathode mesh.

10. The exhaust gas purification system of claim 9, further comprising a medium negative voltage terminal adapted to be connected to a grid mesh located within said housing.

11. The exhaust gas purification system of claim 9, further comprising a monitor circuit electrically connected to the voltage multiplication means.

12. A method of purifying exhaust gas, the method comprising:

providing a housing having an inlet and an outlet;

providing a planar array of cathode pins within the housing, with said pins extending substantially normal to the plane of the array;

providing an anode element within the housing;

passing exhaust gas through the housing from the inlet to the outlet along a flow-path such that the gas passes through the array of cathode pins thereby negatively electrically charging gas borne particles and the gas then passes sufficiently close to the anode element for the anode element to attract and retain the negatively charged particles, and such that the anode element is substantially out of said flow-path.

* * * * *